United States Patent [19]

Hegarty

[11] Patent Number: 5,112,396
[45] Date of Patent: May 12, 1992

[54] ANTI-SAPSTAIN WOOD TREATMENT

[75] Inventor: Bryan Hegarty, Peymeinade, France

[73] Assignee: Rohm and Haas Company, Philadelphia, Pa.

[21] Appl. No.: 475,613

[22] Filed: Feb. 5, 1990

[51] Int. Cl.⁵ .................... A61L 13/00; C09D 5/14; C09D 5/16

[52] U.S. Cl. .................... 106/15.05; 106/12; 106/18.32

[58] Field of Search .................... 424/78, 411, 601; 106/12

[56] References Cited

U.S. PATENT DOCUMENTS

| | | |
|---|---|---|
| 3,755,224 | 9/1973 | Lutz, Jr. . |
| 3,761,488 | 9/1973 | Lewis et al. . |
| 3,801,575 | 4/1974 | Lewis et al. . |
| 3,849,430 | 11/1974 | Lewis et al. . |
| 3,870,795 | 3/1975 | Miller et al. . |
| 3,887,352 | 6/1975 | Lewis et al. . |
| 4,031,055 | 6/1977 | DuPont et al. . |
| 4,062,946 | 12/1977 | Law . |
| 4,067,878 | 1/1978 | Miller et al. . |
| 4,105,431 | 8/1978 | Lewis et al. . |
| 4,127,687 | 11/1978 | DuPont . |
| 4,129,448 | 12/1978 | Greenfield . |
| 4,150,026 | 4/1979 | Miller et al. . |
| 4,322,475 | 3/1982 | Lewis et al. .................... 424/411 |
| 4,325,201 | 4/1982 | Lewis et al. . |
| 4,379,137 | 4/1983 | Ehlers et al. .................... 424/78 |
| 4,396,413 | 8/1983 | Miller et al. . |

FOREIGN PATENT DOCUMENTS

| | | |
|---|---|---|
| 166611 | 1/1986 | European Pat. Off. . |
| 194146 | 9/1986 | European Pat. Off. . |
| 0302701 | 2/1989 | European Pat. Off. . |
| 315464 | 5/1989 | European Pat. Off. . |
| 1474983 | 8/1974 | United Kingdom . |
| 1488891 | 10/1974 | United Kingdom . |

*Primary Examiner*—William R. Dixon, Jr.
*Assistant Examiner*—Melissa Bonner
*Attorney, Agent, or Firm*—Michael B. Fein

[57] ABSTRACT

The use is disclosed of one or more of
(a) a polyquaternary compound,
(b) a thickening agent or dispersing agent,
(c) a nonionic surfactant having from 3 to 12 alkylene oxide, preferably ethylene oxide, units,
(d) a simple quaternary compound in an amount at least equal to the amount of isothiazolone in the solution, to prevent stripping of isothiazolone in an isothiazolone-containing solution used as an anti-sapstain agent in wood treatment, where the solution is recurrently contacted with wood.

7 Claims, No Drawings

ANTI-SAPSTAIN WOOD TREATMENT

BACKGROUND OF THE INVENTION

1. Field of the Invention

This invention is concerned with the anti-sapstain treatment of wood.

2. Description of the Prior Art

Freshly felled timber contains large quantities of fungal nutrients such as sugars. These, together with a high moisture content in the wood make it extremely susceptible to blue stain and mold attack. In order to prevent the wood from such fungal discoloration, the wood is normally treated, by spraying or dipping with a preservative and it is known to incorporate in such preservatives, as an active ingredient, a fungicidal isothiazolone such as that marketed by Rohm and Haas Company as Kathon 893.

A problem which has been noted when dipping wood into solutions of isothiazolone fungicides is that the wood tends preferentially to strip the isothiazolone from the treating mixture so that the concentration of the isothiazolone in the mixture rapidly drops. This has the effect that wood dipped into or sprayed with a freshly made treating mixture is excessively treated with isothiazolone, whereas wood which is dipped into or sprayed with a mixture which has already been used substantially may acquire too little isothiazolone from the mixture which is by then depleted in isothiazolone. Clearly it would be advantageous if the take-up of isothiazolone by wood from the mixture were to be substantially the same as the take-up of the other components of the mixture so that the isothiazolone concentration in the mixture, as the mixture is used, would remain substantially the same.

SUMMARY OF THE INVENTION

It is known to use polymers to thicken wood treatment solutions to increase the uptake of boron wood preservatives by increasing the adherence of the solution to the wood surface.

We have now surprisingly found that, by the incorporation of a certain additive(s) in anti-sapstain mixtures, the stripping of the isothiazolone from the mixture by the wood can be substantially reduced or virtually eliminated: this being contraindicated by the experience in the earlier wood treatment practice.

Accordingly the invention provides in a first aspect the use in an isothiazolone-containing solution of one or more of
- (a) a polyquaternary compound;
- (b) a thickening agent or dispersing agent;
- (c) a nonionic surfactant having from 3 to 12 alkylene oxide, preferably ethylene oxide, units; and
- (d) a simple quaternary compound in an amount at least equal to the amount of isothiazolone in the solution, as an agent for combating stripping of the isothiazolone from said solution when it is to be used as an anti-sapstain treatment composition with which wood is to be contracted recurrently.

DETAILED DESCRIPTION OF THE INVENTION AND THE PREFERRED EMBODIMENTS

As will be apparent to the skilled man, the anti-stripping agent (hereinafter referred to as "additive") should be chosen so as to have no deleterious effect on the wood, on the isothiazolone, or on any of the other optional ingredients which may be found in the mixtures employed in the invention. To exemplify what is meant by a deleterious effect on the wood, if the wood is subsequently intended to be painted, an additive should be chosen which will have no deleterious effect on the paintability of the wood. The choice of additives whilst taking account of these considerations is within the ordinary skill of those in the art.

Both the polyquaternary and simple quaternary compounds are preferably nitrogen-containing compounds. However, other candidate functional groups for additives useful in the invention are phosphonium functional groups, and other suitable compounds are quanidine and related compounds.

Preferred polyquaternary compounds for incorporation into antisapstain mixtures prepared in accordance with the invention are based on (1) polyamines and polyamine ethers, (2) polyvinyl pyrrolidones, (3) polyquaternary ammonium polymers, and (4) cationic copolymers based on acrylates; particularly suitable polymers are (1) Gafquat 755N, a quaternary copolymer of vinylpyrrolidone and dimethylaminoethylmethacrylate, (2) Polyquart H81, a condensation resin of polyamine/polyglycol and (3) Rhoplex LE 1126, a cationic ethylacrylate polymer.

Among suitable thickening or dispersing agents are water soluble and water dispersible polymers including the following: homopolymers and copolymers of (meth-)acrylic acids and esters, vinyl homopolymers and copolymers, and polymers based on glycol monomers and on ether monomers.

Suitable nonionic surfactants are as follows: (1) polyalkoxylates of alkylphenols, alcohols, amines, and alkanolamides, (2) block polymers of ethylene and propylene oxides.

Preferred simple quaternary compounds are ammonium halide salts having the formula:

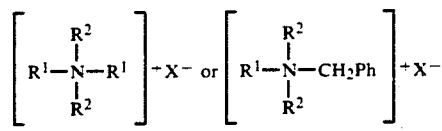

where Ph is $C_6H_5$ or $C_6H_4R$, R is H or $(C_1-C_3)$alkyl, $R^1$ is $(C_8-C_{18})$alkyl, $R^2$ is $(C_1-C_3)$alkyl and X is halogen.

In general, suitable ratios of isothiazolone to anti-stripping additive are from 1:20 to 1:0.1; preferably 1:10 to 1:0.5, most preferably 1:5 to 1:1. However, for simple quaternary compounds a ratio of isothiazolone to additive of 1:1 or less (i.e., more additive) is essential, and the preferred ratio is from 1:5 to 1:20. Additionally variants of these ratios may be required depending, inter alia, on the molecular weight of the additive; for example a minimum isothiazolone to additive ratio of 1:3.5 has been found necessary in some cases so this is a preferred end point for each of the above ratio ranges.

The resulting anti-sapstain compositions for use are generally in the form of a dip or spray mixture and containing 0.005 to 3%, preferably 0.05 to 1.5%, more preferably 0.075 to 1%, most preferably 0.1 to 0.5% by weight of the isothiazolone. Alternatively the composition may be in the form of a concentrate which may contain from 1 to 80%, more usually from 10 to 40% by weight of the isothiazolone and which can be extended at the treatment site to form treatment mixtures containing the level of isothiazolone indicated above.

Isothiazolone useful in the invention comprise any of the isothiazolones described as suitable or preferable in the following Rohm and Haas specifications, GB 1474983, GB1488891, U.S. Pat. No. 4,325,201, U.S. Pat. No. 4,322,475, EP0095907, U.S. Pat. No. 3,870,795, U.S. Pat. No. 4,396,413, U.S. Pat. No. 3,761,488, U.S. Pat. No. 4,067,878, U.S. Pat. No. 3,755,224, U.S. Pat. No. 3,801,575, U.S. Pat. No. 4,067,878, U.S. Pat. No. 3,849,430, U.S. Pat. No. 3,870,795, U.S. Pat. No. 3,887,352, U.S. Pat. No. 4,031,055, U.S. Pat. No. 4,105,431, U.S. Pat. No. 4,129,448 , U.S. Pat. No. 4,062,946; preferably those which have low solubility in water.

Such isothiazolones have the general formula

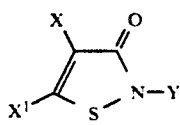

wherein Y may be $(C_1-C_{18})$alkyl or $(C_3-C_{12})$cycloalkyl each optionally substituted with one or more of hydroxy, halo, cyano, alkylamino, dialkylamino, arylamino, carboxy, carbalkoxy, alkoxy, alkylthio, arylthio, haloalkoxy, cycloalkylamino, carbamoxy, or isothiazolonyl; an unsubstituted or halo-substituted $(C_2-C_8)$alkenyl or alkynyl; a $(C_7-C_{10})$aralkyl optionally substituted with one or more of halogen, $(C_1-C_4)$alkyl or $(C_1-C_4)$alkoxyl; and an aryl optionally substituted with one or more of halogen, nitro, $(C_1-C_4)$alkyl, $(C_1-C_4)$alkyl-acylamino, carb$(C_1-C_4)$alkoxy or sulfamyl; and X and $X^1$ may each independently be H, halogen or $(C_1-C_4)$alkyl.

Preferred substituents for Y are substituted or unsubstituted $(C_1-C_{18})$alkyl or $(C_3-C_{12})$cycloalkyl; X is preferred to be H, Me or Cl; and $X^1$ is preferred to be H or Cl. Representative of such preferred Y substituents are methyl, ethyl, propyl, isopropyl, butyl, hexyl, octyl, cyclohexyl, benzyl, 3,4-dichlorobenzyl, 4-methoxybenzyl, 3,4-diclorophenyl, 4-methoxyphenyl, hydroxymethyl, chloromethyl, chloropropyl, and the like.

As is well known, such isothiazolones are usually stabilized against deterioration by the presence of various stabilizing agents several of which are described in the above mentioned patent specifications. Other convenient stabilizing agents and isothiazolones are disclosed in the following specifications: EP-A-0166611, EP-A-0194146 and EP-A-302701.

Especially preferred isothiazolones are: 4,5,dichloro-2-n-octyl-3-isothiazolone, 4,5-dichloro-2-cyclohexyl-3-isothiazolone, and, most preferably, 2-n-octyl-3-isothiazolone. 5-Chloro-2-methyl-3-isothiazolone and 2-methyl-3-isothiazolone may also be used.

The isothiazolones employed in the invention can be in any known form, including micro-emulsion such as is described in pending EP-A-315464.

In another aspect the invention provides a composition comprising
(i) an isothiazolone of the formula

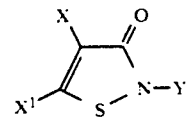

wherein Y is one of $(C_4-C_{12})$alkyl optionally substituted with one or more of hydroxy, halo, cyano, alkylamino, dialkylamine, arylamino, carboxy, carbalkoxy, alkoxy, alkylthio, arylthio, haloalkoxy, cycloalkylamino, carbamoxy, or isothiazolonyl; an unsubstituted or halo-substituted $(C_2-C_8)$alkenyl or alkynyl; and an $(C_7-C_{10})$aralkyl optionally substituted with one or more of halogen, $(C_1-C_4)$alkyl or $(C_1-C_4)$alkoxy, and X and $X^1$ are each independently either H, halogen, or $(C_1-C_4)$alkyl,
(ii) one or more of
(a) a polyquaternary compound;
(b) a thickener or dispersant; or
(c) a simple quaternary compound in an amount at least equal to that of the isothiazolones.

Preferred ratios of (ii) to (i) are as previously described in respect to the first aspect of the invention, as are the preferred compounds (a), (b) and (c) and the preferred isothiazolones.

EXAMPLES

The invention will now be described with reference to the following Examples in which all parts and percentages are by weight unless otherwise specified.

In Examples 1 to 3 a 1000 to 2000 ppm active ingredient aqueous solution of the isothiazolone biocide marketed by Rohm and Haas Company as Kathon 893 containing the active ingredient 2-octyl-3-isothiazolone was emulsified with a mixture of nonionic (300 to 600 ppm) and anionic (600 to 1200) ppm surfactants, together with the additive to be tested. In Example 4, where surfactants were tested emulsification was unnecessary.

Each solution was tested for isothiazolone content. 2.5% w/w of sawdust was added to each solution and the mixture was allowed to stand for 3 hours at 23° C. The solution was then filtered off from the sawdust and analyzed for isothiazolone content.

Without any additive present to prevent stripping, the loss of isothiazolone is typically form 40 to 60%, the precise value depending on the wood used, analytical error and operator error.

EXAMPLE 1

The following polyquaternary compounds were employed as anti-stripping additives:

Luviquat HM 552, a modified copolymer of vinyl pyrrolidone and vinyl imidazoliummethochloride;

Gafquat 755N, a quaternary copolymer of vinyl pyrrolidone and dimethylaminoethyl methacrylate;

Polyquart H81, a polyamine-polyglycol condensation resin;

Busan 77, a poly[oxyethylene (dimethylimino)ethylene (dimethylimino)ethylene dichloride]; and RH-A, a polyquaternary dimethylaminoethylmethacrylate.

Table 1 gives the ratio of isothiazolones (IT) to additive in each case, and the amount of isothiazolone to additive in each case, and the amount of isothiazolone (in parts per million) present before and after the test, together with the percentage loss.

TABLE 1

| Additive | Ratio IT:additive | Detectable isothiazolone (ppm) Before | After | % loss |
|---|---|---|---|---|
| Luviquat Hm 552 | 1:2.5 | 2002 | 1590 | 21% |
| Gafquat 755N | 1:5 | 1000 | 870 | 13% |
| Polyquart H81 | 1:5 | 1000 | 900 | 10% |
| Busan 77 | 1:5 | 1946 | 1390 | 29% |
| RH-A | 1:2.5 | 2011 | 1657 | 17% |

EXAMPLE 2

The following simple quaternary salts were tested as in Example 1: RH-B, a solution of N-octyl-3-isothiazolone and dimethyl benzylammonium chloride (12.5%); Empigen BAC, alkyl dimethyl benzylammonium chloride; and Luviquat Mono Cp, cetyl-dimethyl-(2)-hydroxy-ethylammonium dihydrogen phosphate.

The results are shown in Table 2:

TABLE 2

| Additive | Ratio IT:additive | Detectable isothiazolone (ppm) Before | After | % loss |
|---|---|---|---|---|
| RH-B | 1:5 | 2000 | 1995 | 0.5% |
| Empigen BAC | 1:1 | 1857 | 1282 | 31% |
| | 1:2.5 | 1943 | 1526 | 21% |
| | 1:5 | 2004 | 1776 | 11% |
| Luviquat Mono Cp | 1:2.5 | 1983 | 1774 | 10.5% |

The effect of increasing the proportion of additive is clearly seen here.

EXAMPLE 3

The following dispersing agents were tested as in Example 1:

RH-C (Rohm and Haas Company), a self crosslinkable polyacrylate;

RH-D, a sodium salt of polyacrylic acid; and

RH-E, a low-molecular weight polyacrylic acid.

The results are shown in Table 3.

TABLE 3

| Additive | Ratio IT:additive | Detectable isothiazolones (ppm) Before | After | % loss |
|---|---|---|---|---|
| RH-C | 1:2.5 | 1996 | 1668 | 16% |
| RH-D | 1:2.5 | 1993 | 1600 | 20% |
| RH-E | 1:2.5 | 1995 | 1433 | 28% |

EXAMPLE 4

The following nonionic surfactants were tested as in Example 1, except that no additional surfactants were required for emulsification:

SA1, nonyl phenoxy polyethoxy ethanol (EO content 9.5);

SA2, octyl phenoxy polyethoxy ethanol (EO content 7-8);

SA3, octyl phenoxy polyethoxy ethanol (EO content 15-16);

SA4, octyl phenoxy polyethoxy ethanol (EO content 30).

The results are shown in Table 4.

TABLE 4

| Additive | Ratio IT:additive | Detectable isothiazone (ppm) Before | After | % loss |
|---|---|---|---|---|
| SA3 | 1:0.8 | 860 | 570 | 34% |
| SA4 | 1:0.8 | 850 | 560 | 34% |
| SA1 – SA2 | 1:1:1 | 1972 | 1639 | 17% |

Table 4 shows how the two nonionic surfactants having an EO content outside the scope of the invention have no significant effect on the stripping of isothiazolone, whereas the combination of SA1 and SA2 is very effective.

I claim:

1. The method of using a solution as an anti-sapstain treatment composition, wherein the solution comprises an isothiazolone and a simple quaternary ammonium compound in an amount at least equal to the amount of isothiazolone in the solution.

2. The method according to claim 1 wherein the simple quaternary compound comprises ammonium halide of the formula:

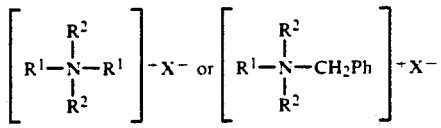

where Ph is $C_6H_5$ or $C^6H^4R$, R or H is $(C_1-C_3)$ alkyl, $R^1$ is $(C_8-C_{18})$alkyl, $R_2$ is $(C_1-C_3)$alkyl, and X is halogen.

3. The method according to claim 1 in which the ratio of isothiazolone to anti-stripping agent is from 1:20 to 1:0.1.

4. The method according to claim 1 wherein the isothiazolone has the formula

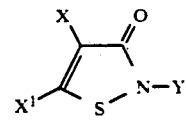

wherein Y is selected from the group consisting of $(C_1-C_{18})$ alkyl or $(C_3-C_{12})$cycloalkyl each optionally substituted with one or more of hydroxy, halo, cyano, alkylamino, dialkylamino, arylamino, carboxy, carbalkoxy, alkoxy, alkylthio, arylthio, haloalkoxy, cycloalkylamino, carbamoxy, or isothiazolonyl; an unsubstituted or halo-substituted $(C_2-C_8)$ alkenyl or alkynyl; a $(C_7-C_{10})$aralkyl optionally substituted with one or more of halogen, $(C^1-C^4)$alkyl or $(C_1-C_4)$alkoxy; and an aryl optionally substituted with one or more of halogen, nitro, $(C_1-C_4)$alkyl, $(C_1-C_4)$alkylacylamino, carb(-$C_1-C_4$)alkoxy or sulfamyl; and X and $X^1$ are independently H, halogen or $(C_1-C_4)$alkyl.

5. A method according to claim 3 wherein the isothiazolone is selected from the group consisting of 4,5-dichloro-2-n-octyl-3-isothiazolone, 4,5-dichloro-2-cyclohexyl-3-isothiazolone, 2-n-octyl-3-isothiazolone, and mixtures thereof.

6. The method according to claim 3 in which the ratio is about 1:10 to 1:0.5.

7. The method according to claim 3 in which the ratio is about 1:5 to 1:1.

* * * * *